US012627009B2

(12) United States Patent
Baek

(10) Patent No.: US 12,627,009 B2
(45) Date of Patent: May 12, 2026

(54) SECONDARY BATTERY

(71) Applicant: SAMSUNG SDI CO., LTD., Yongin-si (KR)

(72) Inventor: Moo Ryong Baek, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 626 days.

(21) Appl. No.: 18/089,044

(22) Filed: Dec. 27, 2022

(65) Prior Publication Data

US 2023/0216157 A1 Jul. 6, 2023

(30) Foreign Application Priority Data

Dec. 30, 2021 (KR) ......................... 10-2021-0192762

(51) Int. Cl.
H01M 50/574 (2021.01)
H01M 50/105 (2021.01)
H01M 50/202 (2021.01)

(52) U.S. Cl.
CPC ....... H01M 50/574 (2021.01); H01M 50/105 (2021.01); H01M 50/202 (2021.01)

(58) Field of Classification Search
CPC . H01M 50/574; H01M 50/202; H01M 50/105
See application file for complete search history.

(56) References Cited

U.S. PATENT DOCUMENTS 7,833,657 B2 11/2010 Kim et al.
7,910,243 B2 3/2011 Koh et al.

2008/0166628 A1 7/2008 Kim et al.
2008/0241654 A1 10/2008 Koh et al.
2008/0292955 A1* 11/2008 Byun .................. H01M 50/572
429/163
2010/0092859 A1 4/2010 Kim et al.

FOREIGN PATENT DOCUMENTS

CN 209804759 U 12/2019
CN 210296564 U 4/2020
KR 10-0846972 B1 7/2008
KR 10-0884473 B1 2/2009
KR 10-2011-0039872 A 4/2011

OTHER PUBLICATIONS

Chinese Office Action dated Nov. 8, 2025, for the Chinese Patent Application No. 202211719952.X corresponding to this application.

* cited by examiner

*Primary Examiner* — Jane J Rhee
(74) *Attorney, Agent, or Firm* — Lee IP Law, P.C.

(57) ABSTRACT

A secondary battery includes a bare cell including an electrode assembly, an electrode tab drawn upwardly from the electrode assembly, and a pouch surrounding the electrode assembly, the electrode tab being exposed to an outside through the pouch, a protection circuit module (PCM) connected to the electrode tab, a case holder disposed between the pouch and the PCM to support the PCM, a case top on the bare cell, the PCM and the case holder being covered by the case top, a case bottom at a bottom side of the bare cell, and a plate attached to a side surface of the bare cell, the plate being coupled to the case top and the case bottom.

15 Claims, 14 Drawing Sheets

SECONDARY BATTERY

CROSS-REFERENCE TO RELATED APPLICATION

This application claims priority to and the benefit of Korean Patent Application No. 10-2021-0192762, filed on Dec. 30, 2021, in the Korean Intellectual Property Office, the contents of which in its entirety are herein incorporated by reference.

BACKGROUND

1. Field

An embodiment of the present disclosure relates to a secondary battery.

2. Description of the Related Art

Unlike a primary battery that cannot be charged, a secondary battery is a battery that can be charged and discharged. Low-capacity secondary batteries may be used in portable small electronic devices, e.g., mobile phones and camcorders, and large-capacity secondary batteries may be used as power sources for driving motors, e.g., in hybrid and electric vehicles. The secondary batteries may be classified into, e.g., a cylindrical shape, a prismatic shape, a pouch type, and the like, according to their external shape. Among those batteries, a pouch type secondary battery, which wraps an electrode assembly by using a pouch, is advantageous in view of its high energy density and space utilization, but may be relatively vulnerable to external impact.

SUMMARY

A secondary battery according to an embodiment of the present disclosure may include a bare cell including an electrode assembly, an electrode tab drawn upwardly from the electrode assembly, and a pouch surrounding the electrode assembly so as to allow the electrode tab to be exposed to the outside; a PCM connected to the electrode tab; a case holder disposed between the pouch and the PCM to support the PCM; a case top installed to receive the PCM and the case holder; a case bottom disposed at a lower side of the bare cell; and a plate attached to a side surface of the bare cell and coupled to the case top and the case bottom.

In addition, by including a first pouch member surrounding one side of the electrode assembly and a second pouch member surrounding the opposite side of the electrode assembly, the pouch has a terrace portion to which the first pouch member and the second pouch member are bonded along the circumference thereof, and the case holder may be disposed on the terrace portion.

In addition, the case holder may extend over the entire width of the bare cell, and an avoidance portion may be formed in which left and right lower corners are partially deleted or recessed.

In addition, the case holder may be formed in the structure of a hollow.

In addition, the case holder may have ribs formed to cross the hollow.

In addition, the case holder may have a protrusion upwardly protruding from an upper surface facing the PCM and being in contact with the PCM.

In addition, the electrode tab may extend upward beyond the pouch and be bent between the PCM and the case holder.

In addition, the secondary battery may further include an adhesion member disposed on the side surface of the bare cell, and the plate may be attached to the side surface of the bare cell by means of the adhesion member.

In addition, the case top may have any one of a projecting part and a groove or hole, and the plate may have the other one of the projecting part and the groove and the hole, and thus the projecting part can be inserted into the groove or hole.

In addition, the case bottom may have any one of a projecting part and a groove or hole, and the plate may have the other one of the projecting part and the groove or hole, and thus the projecting part can be inserted into the groove or hole.

BRIEF DESCRIPTION OF DRAWINGS

Features will become apparent to those of skill in the art by describing in detail exemplary embodiments with reference to the attached drawings, in which.

DETAILED DESCRIPTION

Figure 1:
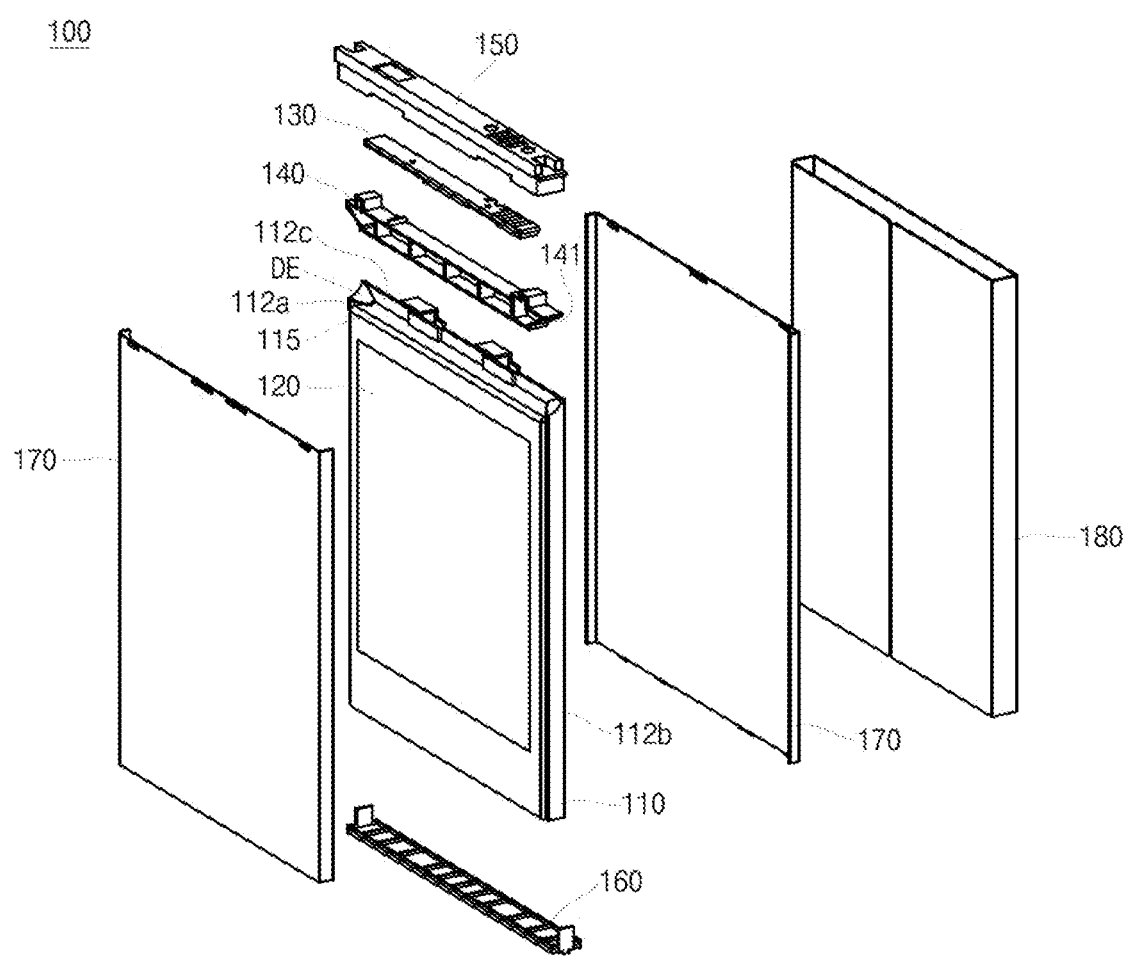
FIG. 1 is an exploded view illustrating a secondary battery according to an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise" or "include" and/or "comprising" or "including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

FIG. 1 is an exploded view illustrating a secondary battery 100 according to an embodiment of the present disclosure.

Referring to FIG. 1, the secondary battery 100 may include a bare cell 110, an adhesion member 120, a protection circuit module (PCM) 130, a case holder 140, a case top 150, a case bottom 160, a plate 170, and a label 180. For example, the secondary battery may be of a polymer type including a polymer electrolyte.

The bare cell 110 may include an electrode assembly 115 having a negative electrode plate, a positive electrode plate, and a separator interposed between the negative electrode plate and the positive electrode plate. The bare cell 110 may further include an electrode tab 111 (e.g., a negative electrode tab) upwardly drawn from one of the electrode plates (e.g., from the negative electrode plate) and another electrode tab (e.g., a positive electrode tab) upwardly drawn from another of the electrode plates (e.g., from the positive electrode plate), and a pouch 112 surrounding the electrode assembly 115 so that the electrode tab 111 is exposed to the outside through the pouch 112 (see FIG. 2).

Figure 2:
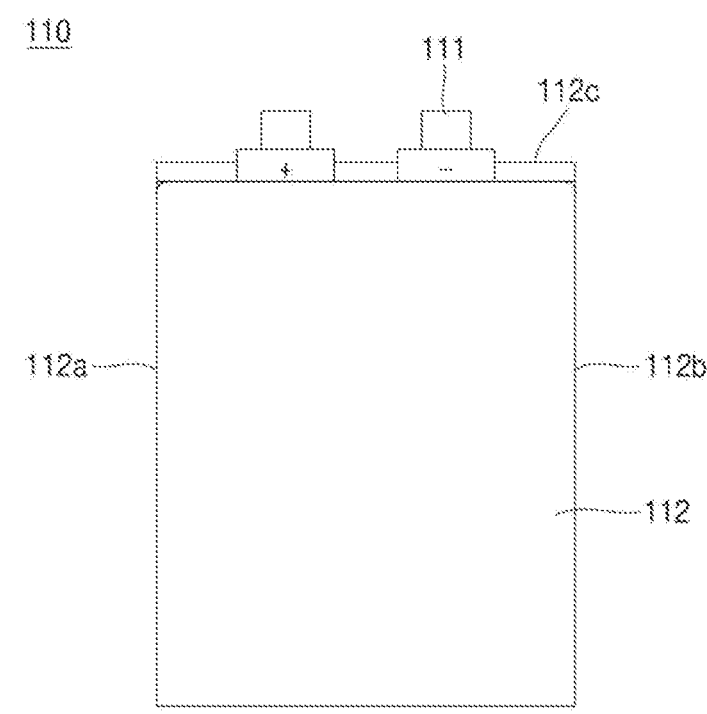
FIGS. 2 to 11 illustrate stages in a process of assembling a secondary battery according to an embodiment of the present disclosure.

The pouch 112 may include a first pouch member mainly surrounding one side of the electrode assembly and a second pouch member mainly surrounding the opposite side of the electrode assembly, and thus allows the first pouch member and the second pouch member to be bonded to each other along the circumference thereof. Here, the bonded portions are often referred to as "terrace portions" and hereinafter, with reference to FIG. 2, the bonded portion on the left side of the electrode assembly is referred to as a "left terrace portion 112a", the bonded portion on the right side of the electrode assembly is referred to as a "right terrace portion 112b", and the bonded portion on the upper side of the electrode assembly is referred to as a "top terrace portion 112c". For reference, FIG. 2 shows that the left terrace portion 112a and the right terrace portion 112b are folded, and up/down/left/right directions or positions mentioned in the present specification are relative to the orientation of the left and right terrace portions 112a and 112b in FIG. 2. The left terrace portion 112a and the right terrace portion 112b may be folded along the inner boundary of each of the terrace portions 112a and 112b so as not to unnecessarily occupy the left and right space. Furthermore, in the left terrace portion 112a and the right terrace portion 112b, the portions adjacent to the top terrace portion 112c, i.e., the top ends of the left terrace portion 112a and the right terrace portion 112b, may be inwardly folded. Here, the folded shape is often referred to as a "dog ear (DE)" (see FIGS. 3A and 3B).

Referring back to FIG. 1, the adhesion member 120 may be provided on one side and the opposite side of the bare cell 110. The adhesion member 120 may be attached to each side of the bare cell 110 by, e.g., a double-sided tape, or may be applied to each side of the bare cell 110 by, e.g., an adhesive.

The PCM 130 may be electrically connected to the electrode tab 111 and may serve to protect the secondary battery 100 from overcharge, overdischarge, and overcurrent.

The case holder 140 may be disposed in a space between a portion of the pouch 112 surrounding the electrode assembly and the PCM 130, i.e., on the top terrace portion 112c overlapping at a top of the electrode assembly, and may support the PCM 130. The case holder 140 may extend over the entire width of the bare cell 110. Here, in order to prevent the left and right lower corners of the case holder 140 from interfering with the dog ear DE, an avoidance portion 141 may be formed (see FIGS. 8C and 8D). In addition, the case holder 140 may be formed in the structure of a hollow to reduce the weight, while ribs 142 crossing the hollow may be formed to enhance rigidity (see FIGS. 8C and 8E). In addition, the case holder 140 may have a protrusion 143 upwardly protruding from an upper surface facing the PCM 130 and being in contact with the PCM 130 (see FIGS. 8C and 8F). Therefore, by supporting the PCM 130 by using the protrusion 143, it is possible to prevent the PCM 130 from being deformed or damaged when pushed or pressed by an external force.

The case top 150 is installed above the bare cell 110 to accommodate the PCM 130 and the case holder 140. For example, as illustrated in FIG. 1, the PCM 130 may be between the case top 150 and the case holder 140.

The case bottom 160 is disposed at the bottom side of the bare cell 110 from below the bare cell 110. For example, as illustrated in FIG. 1, the bare cell 110 may be between the case bottom 160 and the case holder 140.

The plate 170 may be attached to each side of the bare cell 110 by the adhesion member 120. In addition, the plate 170 may be physically coupled to the case top 150, e.g., two plates 170 on respective opposite sides of the bare cell 110 may be coupled to the case top 150 to enclose the bare cell 110 therebetween. For example, top projecting parts 151 may be formed in the case top 150 (see FIGS. 9C and 9D), and top grooves 171, e.g., slits or holes, may be formed in the plate 170, and thus the top projecting parts 151 can be inserted into the top grooves 171 (see FIG. 10). In another example, grooves or holes may be formed in the case top 150, and projecting parts may be formed in the plate 170. Similarly, bottom projecting parts 161 (or grooves) may be formed in the case bottom 160, and the bottom grooves 172 (or projecting parts) may be formed in the plate 170, and thus the bottom projecting parts may be inserted into the bottom grooves, thereby allowing the plate 170 to be physically coupled to the case bottom 160 (see FIG. 10). The plate 170 may be made of, e.g., an SUS material.

The label 180 may be attached to the plate 170 to finish the appearance of the secondary battery 100. For example, referring to FIG. 1, the label 180 may be wrapped around both plates 170 enclosing the bae cell 110.

On the basis of the above-described configuration, a process of assembling the secondary battery will be described below with reference to FIGS. 2-11. FIGS. 2 to 11 illustrates stages in a process of assembling the secondary battery 100 according to an embodiment of the present disclosure.

Figure 3A:
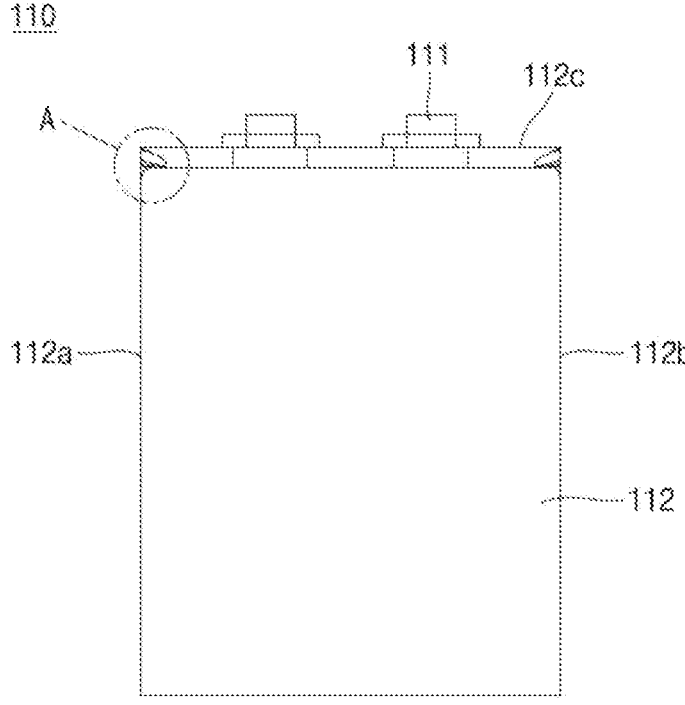
Figure 3B:
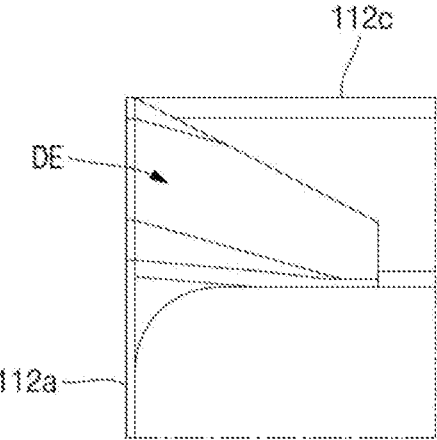

In detail, FIGS. 2, 3A, 4, 5A, 6A, 7A, 8A, 9A, 10, and 11 are schematic side views of the secondary battery. FIG. 3B is an enlarged view of area A in FIG. 3A. FIGS. 5B and 5C show a side view and a perspective view illustrating the upper region in FIG. 5A, respectively. FIGS. 6B and 6C show a side view and a perspective view illustrating the upper region in FIG. 6A, respectively. FIGS. 7B and 7C show a side view and a perspective view illustrating the upper region in FIG. 7A, respectively, i.e., showing states in which the case holder 140 is installed. FIGS. 8B and 8C show a side view and a perspective view illustrating the upper region in FIG. 8A, respectively, FIG. 8D is an enlarged view of area B in FIG. 8C, FIG. 8E is an enlarged view of area C in FIG. 8C, and FIG. 8F is an enlarged view of area D in FIG. 8C. FIGS. 9B, 9C, and 9D show a side view and perspective views illustrating the upper region in FIG. 9A, respectively, Specifically, FIGS. 9B and 9C show states in which the case top 150 is being installed, and FIG. 9D shows a state in which the case top 150 has been installed.

First, as shown in FIG. 2, the bare cell 110 is prepared, and the left terrace portion 112a and the right terrace portion 112b are folded. For example, referring to FIGS. 1 and 2, the left terrace portion 112a and the right terrace portion 112b may be folded toward sidewalls of the electrode assembly 115, while the top terrace portion 112c may protrude above the top of the electrode assembly 115, e.g., the folded left and right terrace portions 112a and 112b may be perpendicular to the top terrace portion 112c (FIG. 1). In addition, as shown in FIGS. 3A and 3B, the top ends of the left terrace portion 112a and the right terrace portion 112b are folded inward to form the dog ear DE, and the electrode tab 111 may be cut to an appropriate length. For example, referring to FIG. 1 and FIG. 3B, the top ends (e.g., top corners) of the left and right terrace portions 112a and 112b above the top of the electrode assembly may be folded toward the top of the electrode assembly 115 to form the dog ears DE.

Figure 4:
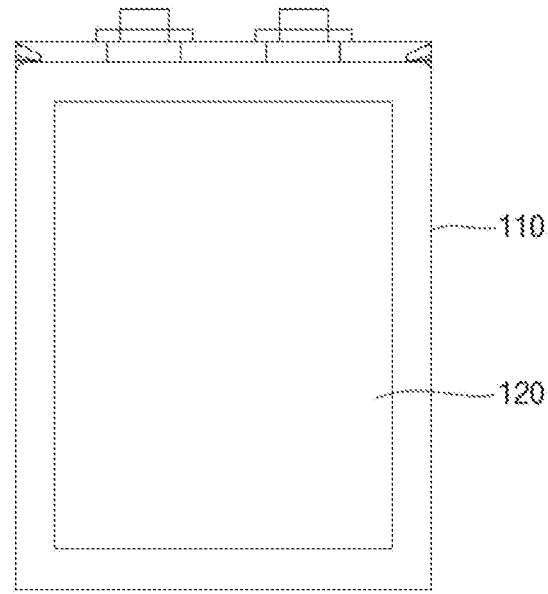

Next, as shown in FIG. 4, the adhesion member 120 may be disposed on each side of the bare cell 110. For example, a double-sided tape may be attached to each side of the bare cell 110, or an adhesive may be applied to each side of the bare cell 110.

Figure 5A:
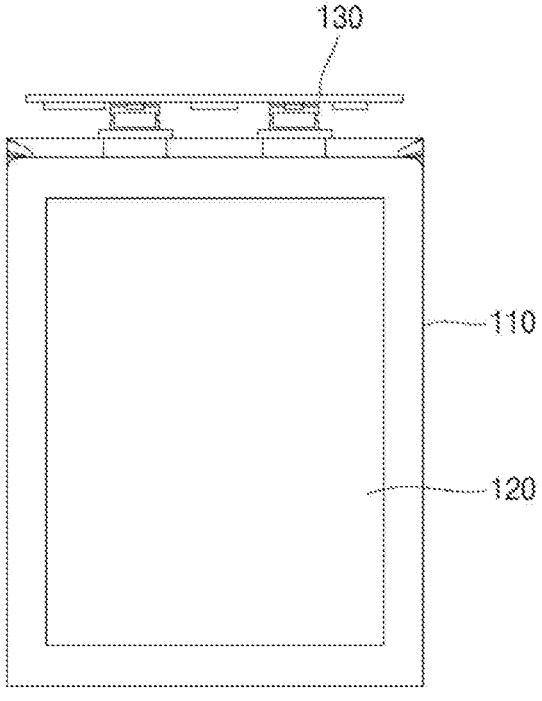
Figure 5B:
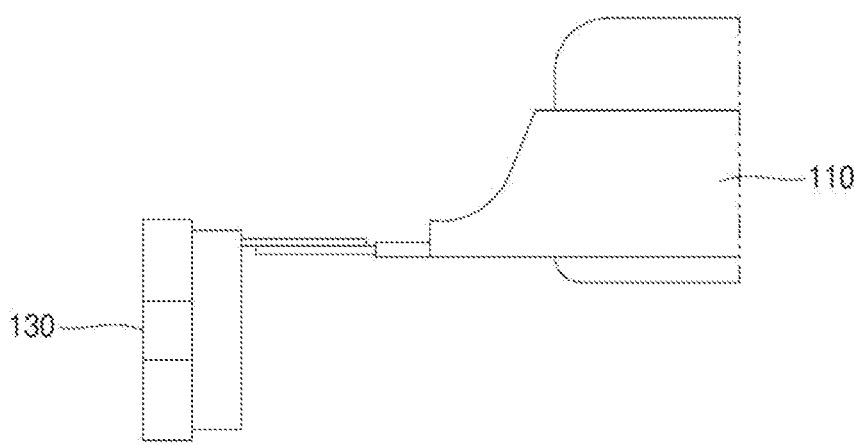
Figure 5C:
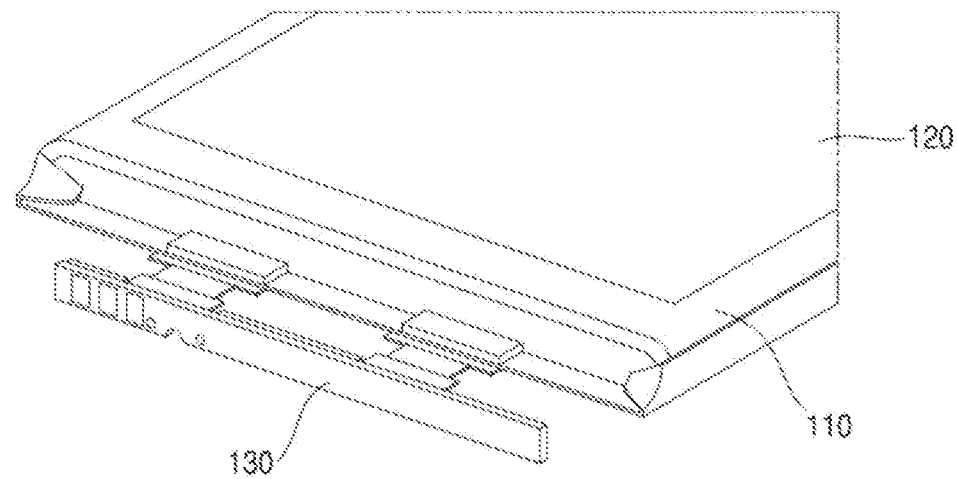

Next, as shown in FIGS. 5A, 5B, and 5C, the PCM 130 may be connected to the electrode tab 111. Here, the electrode tab 111 and the PCM 130 may be oriented perpendicular to each other, as illustrated in FIG. 5B. For example, a connection portion may be placed in an "L" shape, and may weld the electrode tab 111 to one end of the connection portion, while welding the PCM 130 to the other end of the connection portion.

Figure 6A:
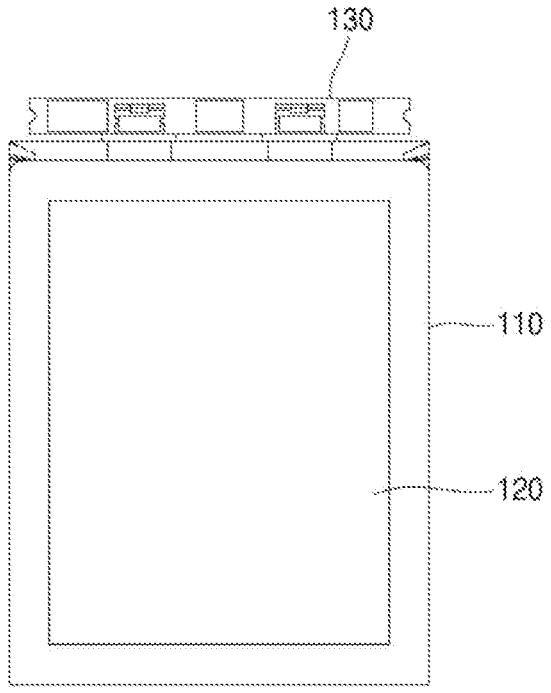
Figure 6B:
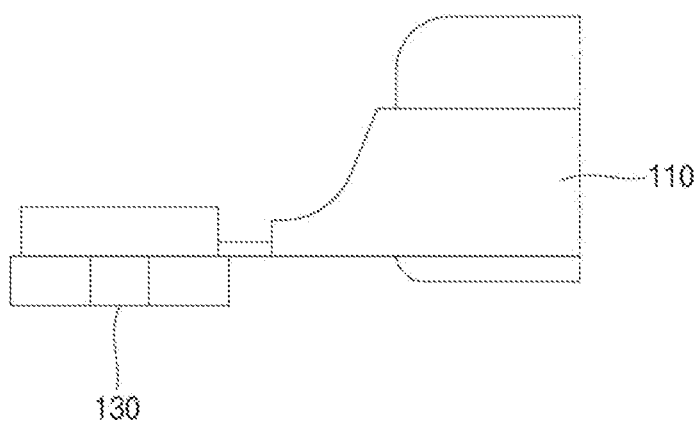
Figure 6C:
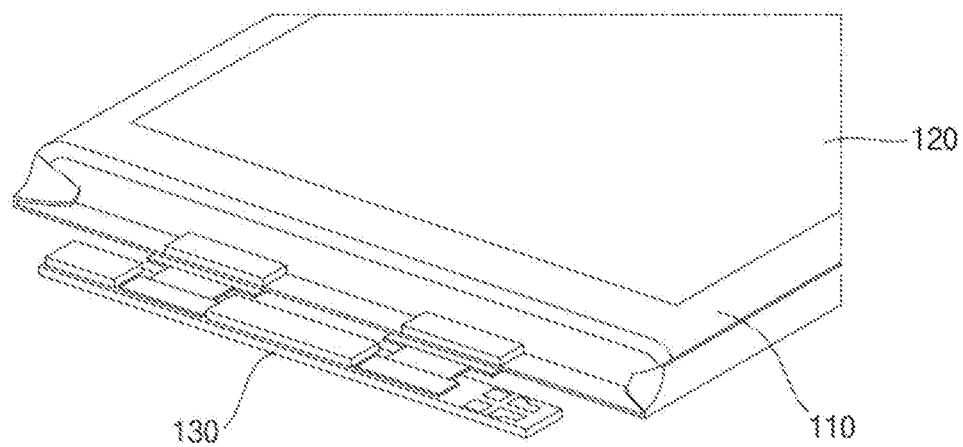

Next, as shown in FIGS. 6A, 6B, and 6C, the connection portion is folded so that the electrode tab 111 is positioned on the PCM 130.

Figure 7A:
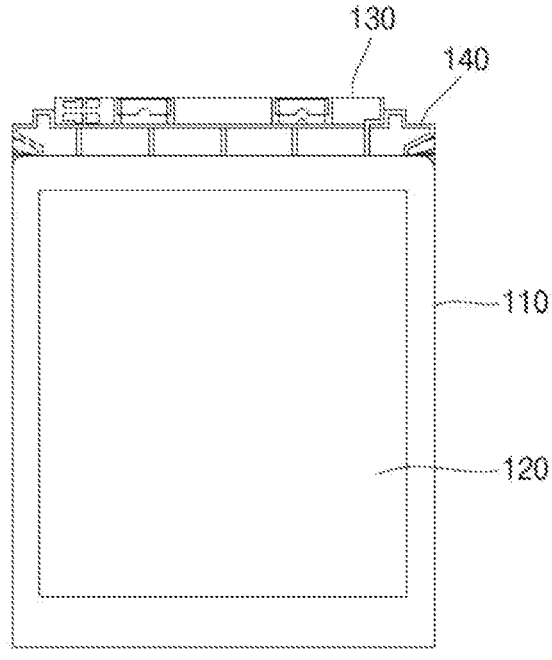
Figure 7B:
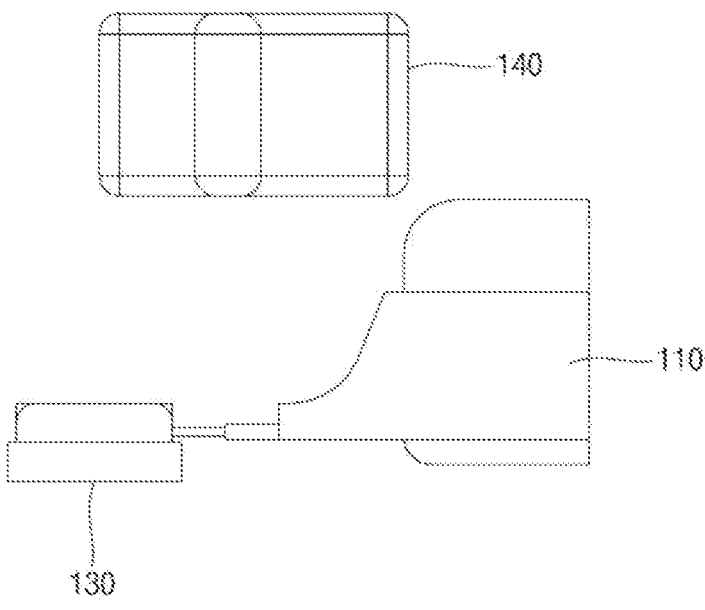
Figure 7C:
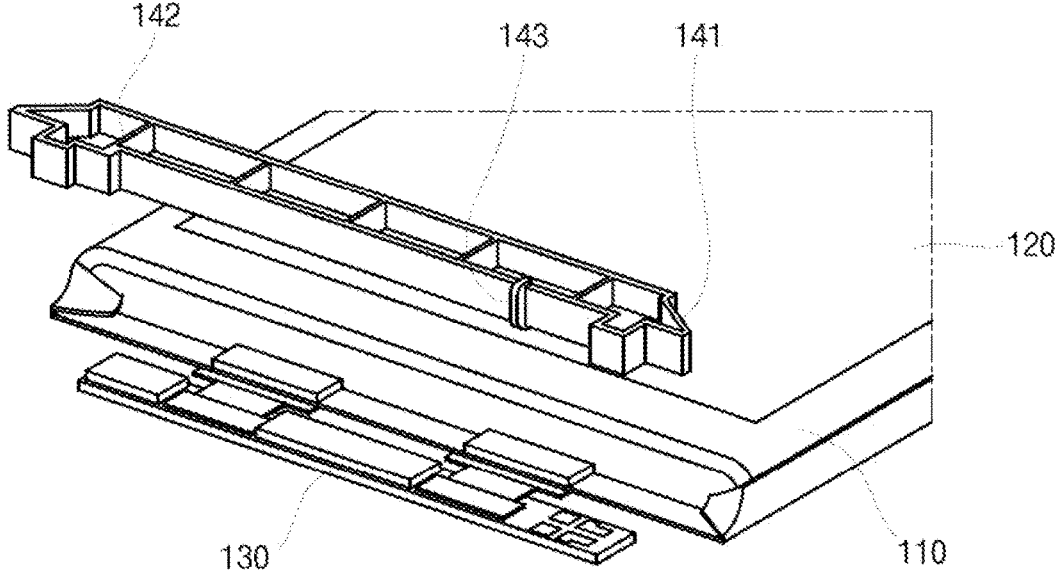

Next, as shown in FIGS. 7A, 7B, and 7C, the case holder 140 may be disposed in a space between a portion of the bare cell 110 surrounding the electrode assembly and the PCM 130, i.e., on the top terrace portion 112c.

Figure 8A:
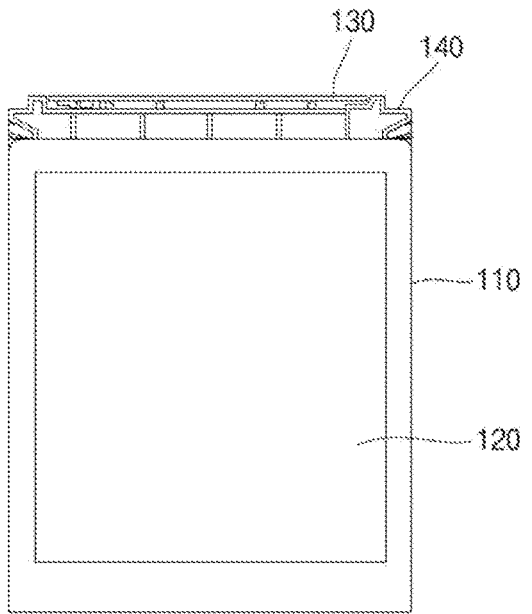
Figure 8B:
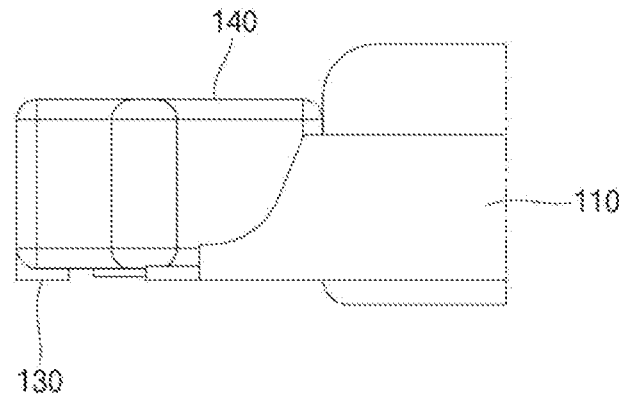
Figure 8C:
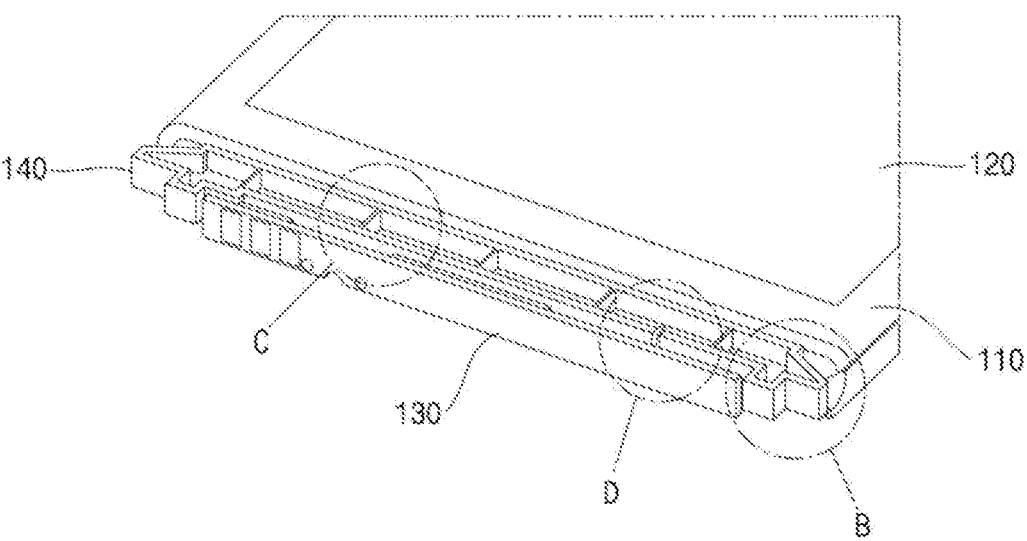
Figure 8D:
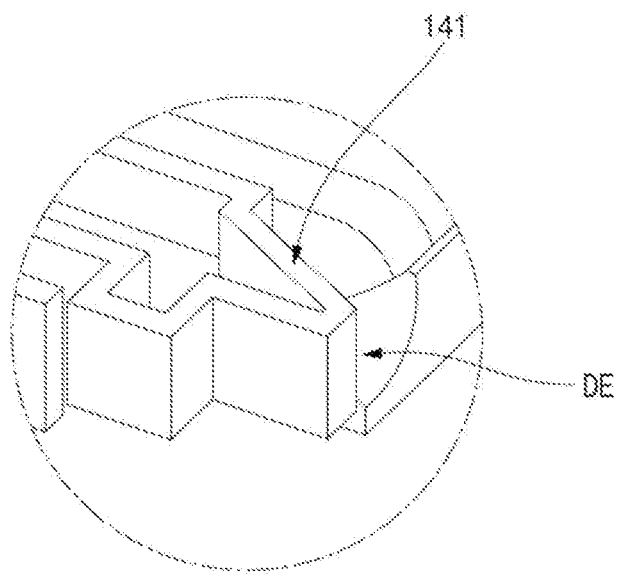
Figure 8E:
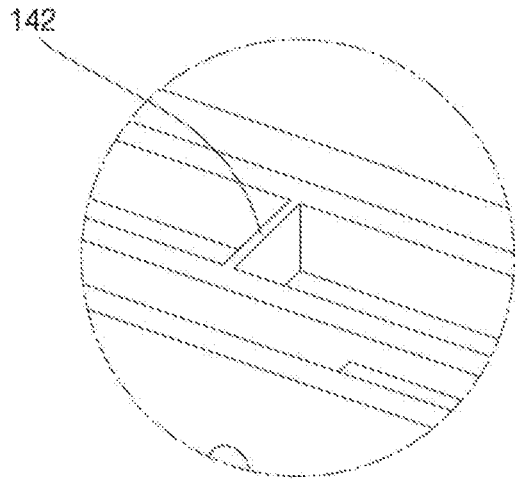
Figure 8F:
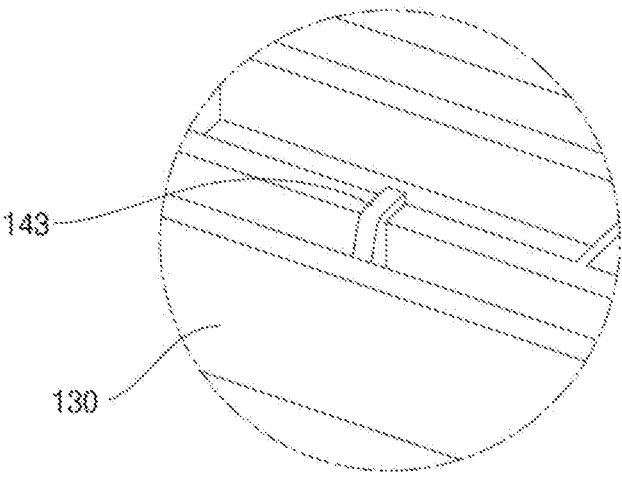

Next, as shown in FIGS. 8A, 8B, and 8C, the electrode tab 111 is folded so that the PCM 130 is positioned on the case holder 140. As a result, the case holder 140 is disposed on the top terrace portion 112c, the PCM 130 is disposed above the case holder 140, and the electrode tab 111 extends upward beyond the pouch 112 and is then bent between the PCM 130 and the case holder 140, and thus can be constructed to be connected to the PCM 130.

Referring to FIGS. 8C and 8D, since the avoidance portion 141 is formed in the case holder 140, it is possible to prevent the left and right lower portions of the case holder 140 from interfering with the dog ear DE. For example, referring to FIGS. 7C and 8C, the avoidance portions 141 may have a triangular shape, and may be at opposite edges of the case holder 140 along a longitudinal direction of the case holder 140, e.g., the triangular shape may be adjacent to the dog ear DE without interfering with the dog ear DE (FIG. 8D).

Further, referring to FIGS. 7C, 8C, and 8E, the case holder 140 is formed in the structure of a hollow to reduce the weight thereof, while ribs 142 crossing the hollow are formed to reinforce rigidity. For example, referring to FIG. 7C, the case holder 140 may have a shape of a hollow rectangular frame with the avoidance portions 141 at opposite edges thereof. For example, referring to FIG. 1, the triangular shape of the avoidance portion 141 is oriented such that a sharp edge of the triangular shape is inserted above the dog ear DE, while a lower corner of the case holder 140 below the sharp edge of the triangular shape of the avoidance portion 141 is recessed, e.g., a lower corner of the hollow rectangular frame of the case holder 140 may be partially removed, recessed, or deleted to accommodate the dog ear DE and avoid interference therewith. For example, as illustrated in FIG. 7C, the case holder 140 may include a plurality of ribs 142 within the hollow rectangular frame that are spaced apart from each other along the longitudinal direction of the case holder 140 while extending along a direction perpendicular to the longitudinal direction of the case holder 140. The ribs 142 may cross the hollow frame and be in direct contact with the hollow frame, e.g., the ribs 142 may be between the avoidance portions 141.

In addition, referring to FIGS. 8C and 8F, since the case holder 140 supports the PCM 130 by using the protrusion 143, it is possible to effectively prevent the PCM 130 from being deformed or damaged when pushed or pressed by an external force. For example, referring to FIG. 7C, the protrusion 143 may protrude from a side of the hollow rectangular shape of the case holder, such that, after folding the electrode tab 111 to have the PCM 130 positioned on the case holder 140, the protrusion 143 supports the PCM 130 (FIG. 8C).

Figure 9A:
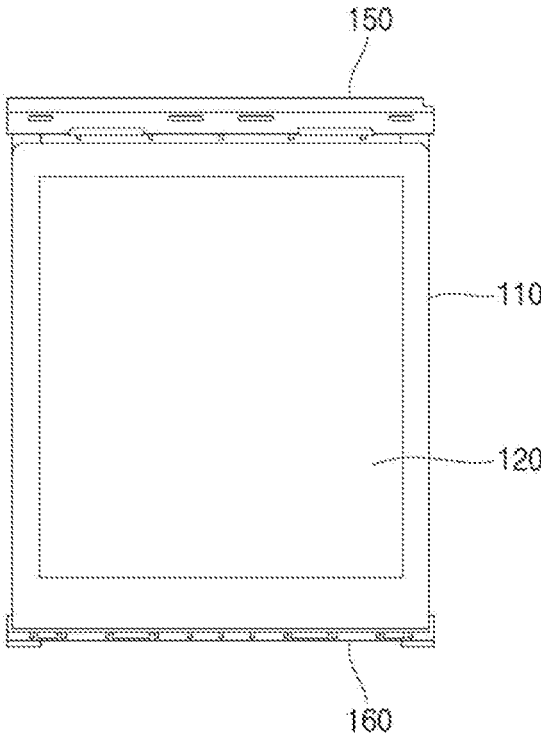
Figure 9B:
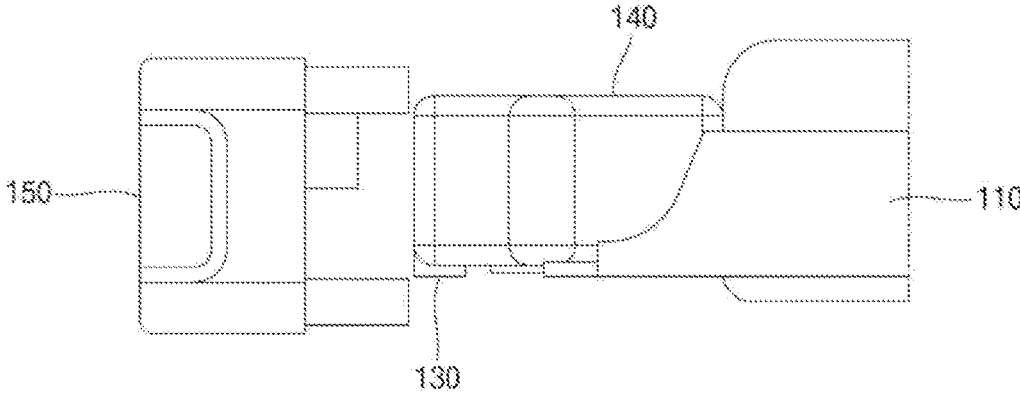
Figure 9C:
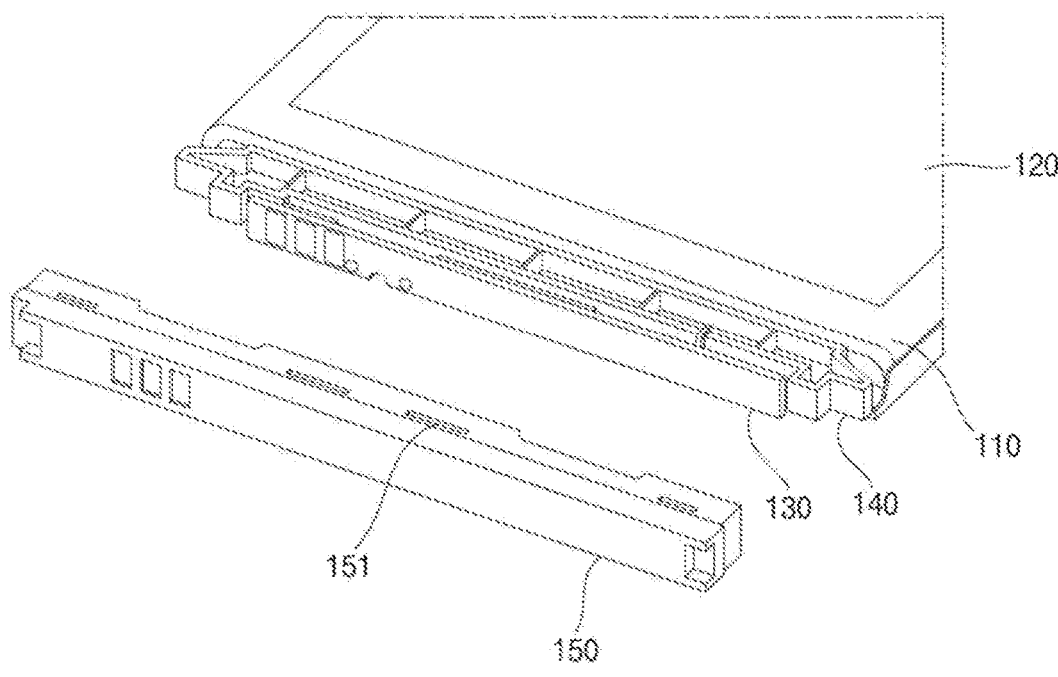
Figure 9D:
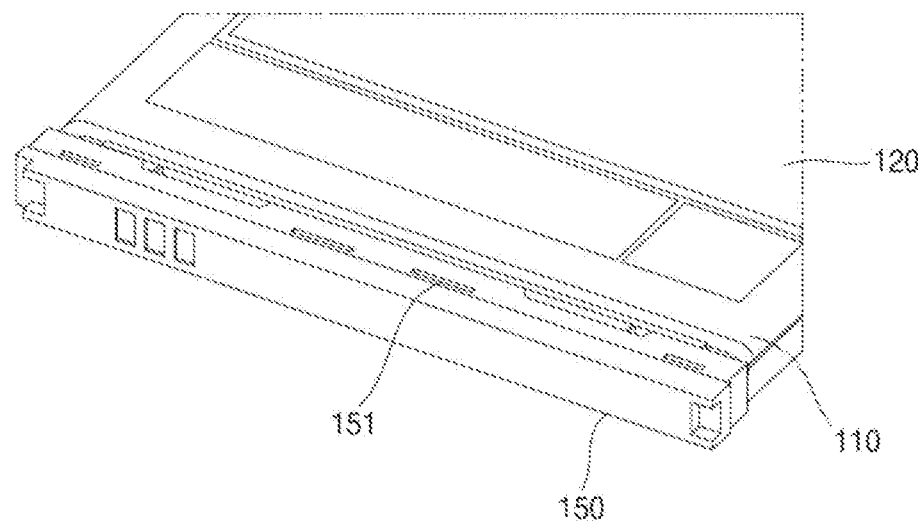

Next, as shown in FIGS. 9A, 9B, and 9C, the case top 150 is installed to accommodate the PCM 130 and the case holder 140 from above the bare cell 110. After installation of the case top 150, as illustrated in FIG. 9D, the PCM 130 and the case holder 140 are completely covered by the case top 150, e.g., the PCM 130 and the case holder 140 are completely within an interior of the case top 150. The case bottom 160 may be disposed at the bottom side of the bare cell 110 from below the bare cell 110.

Figure 10:
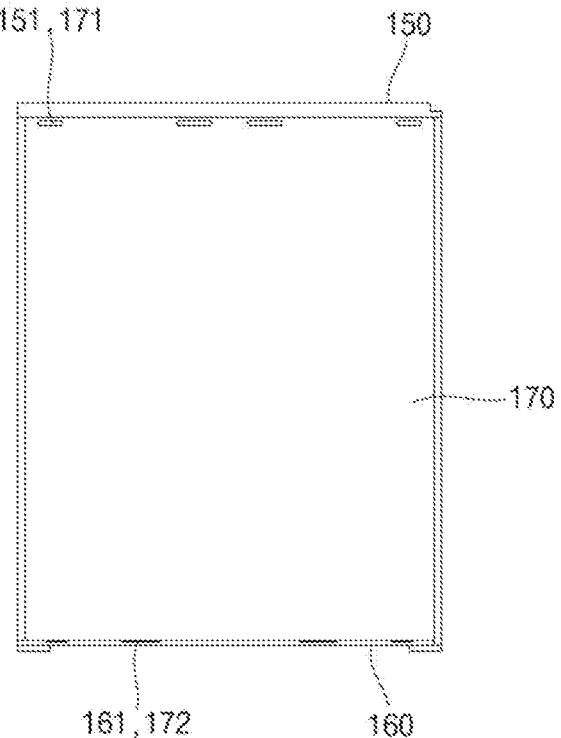

Next, as shown in FIG. 10, the plate 170 is disposed on each side of the bare cell 110. The plate 170 is attached to each side of the bare cell 110 by the adhesion member 120. Meanwhile, the top projecting parts 151 of the case top 150 are inserted into the top grooves 171 of the plate 170, and thus the plate 170 can be coupled to the case top 150, and the bottom projecting parts 161 of the case bottom 160 are inserted into the bottom grooves 172 of the plate 170, and thus the plate 170 can be coupled to the case bottom 160.

Figure 11:
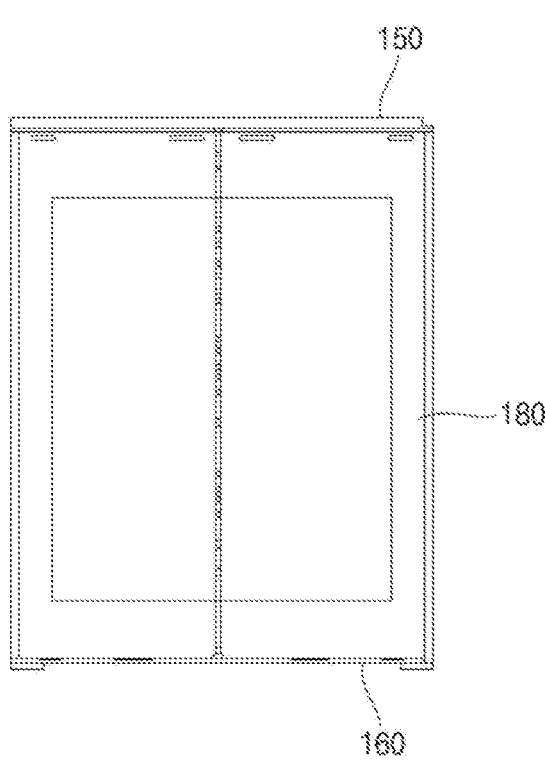

Finally, as shown in FIG. 11, the label 180 may be attached to the plate 170.

By way of summation and review, an embodiment of the present disclosure provides a pouch type secondary battery capable of improving stability. That is, as described above, an embodiment of the present disclosure provides a pouch type secondary battery capable of improving stability by supporting the PCM 130 by using the case holder 140 and protecting the bare cell 110 by using the case top 150, the case bottom 160, and the plate 170.

Specifically, with respect to the case holder 140, when a dog ear DE is formed by an inwardly folding the upper ends of the left and right terrace portions 112*a* and 112*b*, the avoidance portions 141 of the case holder 140 are formed so as not to interfere with the dog ear DE, thereby further improving structural stability. In addition, the case holder 140 may be formed in the structure of a hollow to reduce the weight thereof, while the ribs 142 crossing the hollow may be formed to reinforce rigidity of the case holder 140. In addition, by forming the case holder 140 with a protrusion 140 protruding upwardly from an upper surface to face the PCM 130 and to contact the PCM 130, it is possible to effectively prevent the PCM 130 from being deformed or damaged when pushed or pressed by an external force.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
a bare cell including an electrode assembly, an electrode tab drawn upwardly from the electrode assembly, and a pouch surrounding the electrode assembly, the electrode tab being exposed to an outside through the pouch;
a protection circuit module (PCM) connected to the electrode tab;
a case holder between the pouch and the PCM to support the PCM, the case holder extending along a width of the bare cell, and the case holder having an avoidance portion recessed at a lower corner of the case holder;
a case top on the bare cell, the PCM and the case holder being covered by the case top;
a case bottom at a bottom side of the bare cell; and
a plate attached to a side surface of the bare cell, the plate being coupled to the case top and the case bottom,
wherein the case holder has a structure of a frame surrounding a hollow interior, a portion of the case holder separating the hollow interior from the PCM being a portion of the frame,
wherein the frame includes two long sides parallel to each other and to a major surface of the PCM, the two long sides being separated from each other by the hollow interior, and one of the two long sides separating the hollow interior from the PCM, and
wherein the avoidance portion connects ends of the two long sides of the frame, the avoidance portion having a triangular shape.

2. The secondary battery as claimed in claim 1, wherein the pouch includes a terrace portion overlapping at a top of the electrode assembly, the case holder being on the terrace portion.

3. The secondary battery as claimed in claim 1, wherein the case holder includes ribs crossing the hollow frame.

4. The secondary battery as claimed in claim 1, wherein the case holder includes a protrusion protruding upwardly from an upper surface of the case holder facing the PCM, the protrusion being in contact with the PCM.

5. The secondary battery as claimed in claim 1, wherein the electrode tab extends upwardly beyond the pouch and is bent between the PCM and the case holder.

6. The secondary battery as claimed in claim 1, further comprising an adhesion member on a side surface of the bare cell, the plate being attached to the side surface of the bare cell by the adhesion member.

7. The secondary battery as claimed in claim 1, wherein the case top includes any one of a projecting part and a groove, and the plate has the other one of the projecting part and the groove, the projecting part being inserted into the groove.

8. The secondary battery as claimed in claim 1, wherein the case bottom has any one of a projecting part and a groove, and the plate has the other one of the projecting part and the groove, the projecting part being inserted into the groove.

9. A secondary battery, comprising:
a bare cell including an electrode assembly, an electrode tab drawn upwardly from the electrode assembly, and a pouch surrounding the electrode assembly, the electrode tab being exposed to an outside through the pouch;
a protection circuit module (PCM) connected to the electrode tab;
a case holder between the pouch and the PCM to support the PCM, the case holder including a hollow interior, a portion of the case holder separating the hollow interior from the PCM and supporting the PCM;
a case top on the bare cell, the PCM and the case holder being covered by the case top;
a case bottom at a bottom side of the bare cell; and
a plate attached to a side surface of the bare cell, the plate being coupled to the case top and the case bottom
wherein the case holder has a structure of a frame surrounding the hollow interior, the portion of the case holder separating the hollow interior from the PCM being a portion of the frame,
wherein the frame includes two long sides parallel to each other and to a major surface of the PCM, the two long sides being separated from each other by the hollow interior, and one of the two long sides separating the hollow interior from the PCM, and
wherein the case holder includes ribs extending through the hollow interior between the two long sides, the ribs being spaced apart from each other and perpendicular to the two long sides of the frame.

10. The secondary battery as claimed in claim 9, wherein the case holder includes ribs extending through the hollow interior of the frame.

11. The secondary battery as claimed in claim 9, wherein the frame further includes an avoidance portion connecting ends of the two long sides of the frame, the avoidance portion having a triangular shape.

12. The secondary battery as claimed in claim 11, wherein the triangular shape is oriented with a sharp end pointing away from the hollow interior.

13. The secondary battery as claimed in claim 9, wherein the portion of the case holder separates an entire bottom surface of the PCM from the hollow interior, the PCM being directly on the portion of the case holder.

14. The secondary battery as claimed in claim 9, wherein the PCM is directly on an upper portion of the case holder, the hollow interior being between the upper portion of the case holder and a lower portion of the case holder.

15. The secondary battery as claimed in claim 14, wherein the case holder includes a protrusion protruding upwardly from the upper portion of the case holder toward the PCM, the protrusion being perpendicular to the upper portion of the case holder and contacting the PCM.

\* \* \* \* \*